_UNITED STATES PATENT OFFICE._

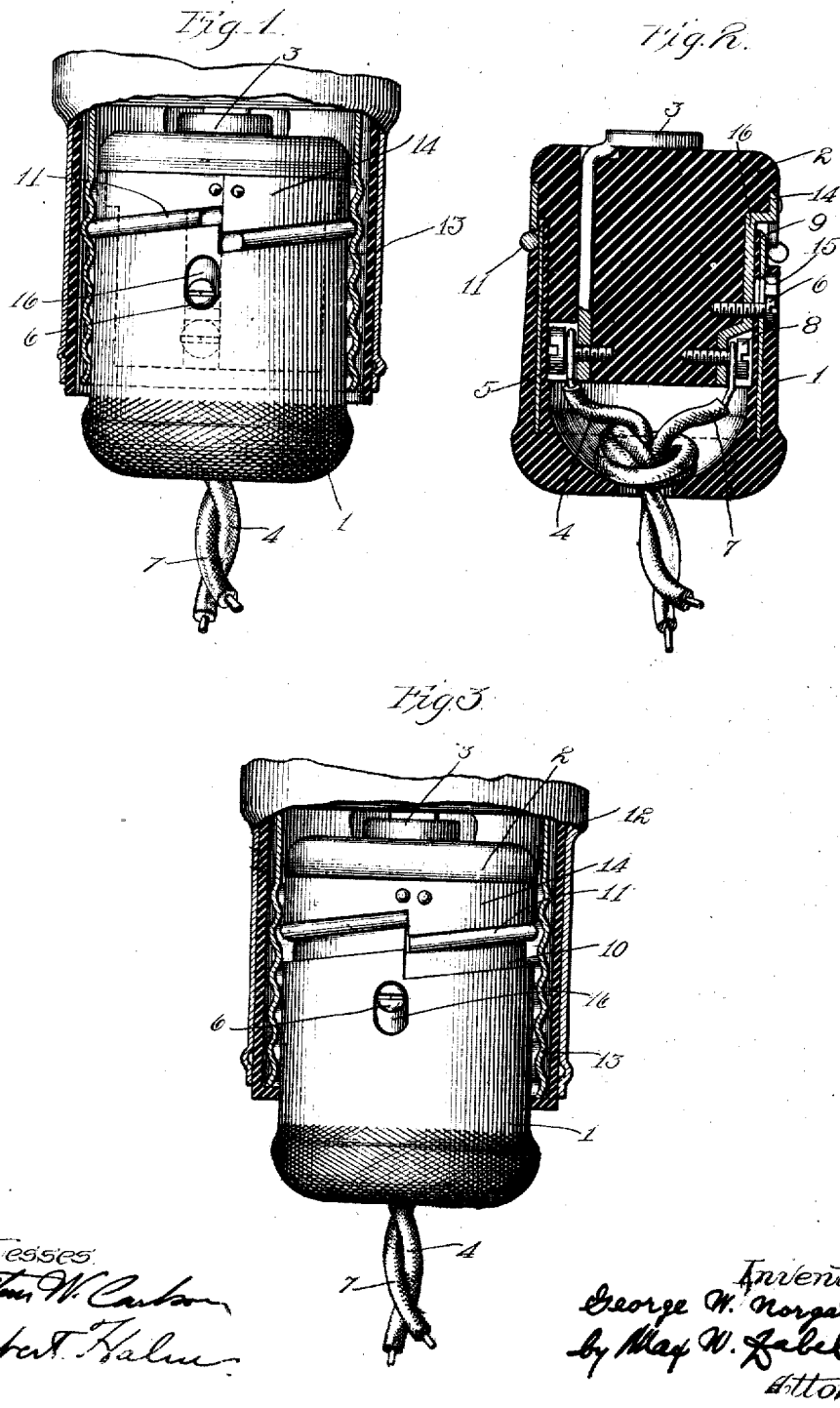

GEORGE W. NORGATE, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

PLUG.

1,266,979.     Specification of Letters Patent.     Patented May 21, 1918.

Application filed June 26, 1914. Serial No. 847,385.

_To all whom it may concern:_

Be it known that I, GEORGE W. NORGATE, a citizen of the United States, residing at Chicago, in the county of Cook and State of Illinois, have invented a certain new and useful Improvement in Plugs, of which the following is a full, clear, concise, and exact description, reference being had to the accompanying drawings, forming a part of this specification.

My invention relates to plugs or connecting devices and has for its object the provision of an improved connecting device for electric circuits adapted to establish circuit connections with the customary form of screw threaded socket.

My invention contemplates the provision of a plug having means adapted by the insertion of the plug within the socket to cause the enlargement or expansion of said means sufficiently to engage the convolutions of the screw threaded portion of the socket, thereby to hold the plug in position. The structure is such that the plug may be removed from the socket merely by exerting a strong pull against the plug, thus causing a contraction of the means to permit the ready withdrawal of the plug.

In the preferred form of my invention, I utilize as the expansible portion of the means a spring having the shape of a convolution of a screw thread of the socket, which spring preferably extends throughout a portion of the circumference of the plug substantially 360° in order to get sufficient contact for electrical purposes. The plug has a pair of relatively movable members, movement of which in one direction causes the expansion of the said spring to enter the recess of the screw thread of the socket. If the plug is inserted into the socket so that the spring and the depressed portion of a screw thread are not exactly superposed, then a slight rotation of the plug is necessary to lock the plug in position as will be readily apparent from the description which will now be given of one form which my improved plug may take in connection with the accompanying drawing illustrating such embodiment, in which—

Figure 1 is a side view of a plug constructed in accordance with my invention shown in a socket;

Fig. 2 is a longitudinal sectional view of my improved plug, and

Fig. 3 is a view similar to Fig. 1 with the plug as yet in its unlocked position.

My improved plug has two relatively movable members respectively 1 and 2. The member 2 has a central contact 3 mounted thereon which is in electrical association with one of the lead in wires 4 through the agency of the binding screw 5, as readily apparent. The parts 1 and 2 are held together by the screw 6 so that when the screw 6 is removed the lead in wires 4 and 7 can be readily attached to the binding screws 5 and 8. The portion 1 has an annular plate therefor which is flaring as shown at 9 upon which flaring portion and the straight extension 10 thereof, a spring 11 is adapted to be slid from the contracted position of Fig. 3 to the expanded position shown in Figs. 1 and 2. When the plug is pushed into the socket 12 the plate 2 moves inwardly relatively to the part 1, thereby pushing the spring ring 11 over the flaring or diverging portion 9 so that this spring is expanded to enter one of the recesses of the screw threaded portion 13 of the socket, thus to hold the plug in position.

It will be noted that when the plug is in place the element 11 is upon a straight cylindrical portion 10 so that it does not tend of itself to move into the position whereby it encircles the portion of restricted diameter as at 9. Now when a pull however is exerted against the part 1 of Fig. 1, then part 1 moves outwardly, leaving the ring 11 behind, thus sliding it along the portion 10 and permitting it to ride downwardly over the flaring portion 9 so that this ring contracts into the position shown in Fig. 3, under which conditions this ring 11 clears the screw threaded portions of the socket. The plug may thus be withdrawn by merely exerting a pull against the element 1. Electrical contact is effected between the screw threaded element of the plug and the conductor 7 through the agency of the contact strip 14 with which said ring engages and by having the ring 11 engage the conducting strip 15, mounted within the plate 1, which conducting strip through the agency of the screw 6 is in electrical contact with the conducting plate 16 to which the screw 8 is secured.

The contact thus is of substantial nature as the element 11 slides over the plate 15 when being locked into position, thus insuring good contact. As shown in this particular form the ring 11 extends throughout substantially 360° of the circumference of the plug and has the shape and pitch of the screw thread of the socket.

From what has been described it is thought the nature of my invention will be readily clear to those skilled in the art, and what I therefore claim as new and desire to secure by Letters Patent is:

1. A connecting plug of the character described having two relatively movable members, and a spring having a shape conforming to the pitch of the screw thread of a socket mounted upon the periphery of one of said members controlled by the relative movement between said members to increase its diameter for engagement with said screw thread or decrease it sufficiently to allow it to be drawn from said socket without rotation.

2. A connecting plug of the character described having two relatively movable members, and a spring having a shape conforming to the pitch of the screw thread of a socket mounted upon the periphery of one of said members and cam shaped means over which said spring is movable by the relative movement between said plug members to increase its diameter for engagement with the screw thread of a socket or to decrease its diameter sufficiently to allow it to be withdrawn from said socket without rotation.

3. A plug of the character described having two relatively movable members, one of said members protruding when the plug is in position with respect to a socket, a spring contact, and means controlled by the relative movement of said members to enlarge or reduce said spring contact sufficiently to allow it to be withdrawn from the screw threads of a socket without rotation to thereby cause it to engage or disengage from the screw threaded portion of a socket, said means permitting a disconnection of the plug from the socket when a pull is exerted against the protruding member of said plug.

4. A plug of the character described having two relatively movable members, one of said members protruding when the plug is in position with respect to a socket, a spring contact, and means controlled by the relative movement of said members to enlarge or reduce said spring contact to increase its diameter for engagement with the screw threads of a socket or to decrease its diameter sufficiently to allow it to be withdrawn from said socket without rotation to thereby cause it to engage or disengage from the screw threaded portion of a socket, said means permitting a disconnection of the plug from the socket when a pull is exerted against the protruding member of said plug, by causing a relative movement between said protruding member and said spring contact.

In witness whereof, I hereunto subscribe my name this 23rd day of June, A. D. 1914.

GEORGE W. NORGATE.

Witnesses:
MAX W. ZABEL,
HAZEL ANN JONES.